(12) United States Patent
Beck et al.

(10) Patent No.: US 9,447,848 B2
(45) Date of Patent: Sep. 20, 2016

(54) TRANSMISSION

(71) Applicant: ZF Friedrichshafen AG, Friedrichshafen (DE)

(72) Inventors: Stefan Beck, Eriskirch (DE); Johannes Kaltenbach, Friedrichshafen (DE); Ulrich Kehr, Tettnang (DE); Michael Trubenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 61 days.

(21) Appl. No.: 14/549,641

(22) Filed: Nov. 21, 2014

(65) Prior Publication Data

US 2015/0167788 A1 Jun. 18, 2015

(30) Foreign Application Priority Data

Dec. 18, 2013 (DE) .................. 10 2013 226 473

(51) Int. Cl.
*F16H 3/44* (2006.01)
*F16H 3/66* (2006.01)

(52) U.S. Cl.
CPC ......... *F16H 3/66* (2013.01); *F16H 2200/0039* (2013.01); *F16H 2200/201* (2013.01); *F16H 2200/2007* (2013.01); *F16H 2200/2038* (2013.01); *F16H 2200/2064* (2013.01); *F16H 2200/2094* (2013.01); *F16H 2200/2097* (2013.01)

(58) Field of Classification Search
CPC ................ F16H 2200/2038; F16H 2200/2007
See application file for complete search history.

(56) References Cited

U.S. PATENT DOCUMENTS

| 4,497,219 | A |   | 2/1985  | Elsner |
|-----------|---|---|---------|--------|
| 5,358,458 | A |   | 10/1994 | Hicks  |
| 5,435,794 | A | * | 7/1995  | Mori ............... B60K 17/046 475/338 |
| 5,823,910 | A |   | 10/1998 | Park   |
| 7,377,874 | B2|   | 5/2008  | Hayabuchi et al. |

(Continued)

FOREIGN PATENT DOCUMENTS

| DE | 1 102 571 B   | 3/1961 |
|----|---------------|--------|
| DE | 31 34 259 A1  | 3/1983 |

(Continued)

OTHER PUBLICATIONS

German Search Report Corresponding to 10 2013 226 473.9 mailed Mar. 14, 2014.
German Search Report Corresponding to 10 2013 226 479.8 mailed Mar. 14, 2014.

*Primary Examiner* — Tisha Lewis
(74) *Attorney, Agent, or Firm* — Davis & Bujold PLLC; Michael J. Bujold

(57) ABSTRACT

A transmission which has drive input and output shafts, a housing, two planetary gearsets (PR1, PR2), and at least three shifting elements which produce three gears or ratios. A ring gear of the gearset (PR1) and the input shaft are connected for forming a first shaft, a carrier of gearset (PR1) and the output shaft are connected for forming a second shaft, a ring gear of gearset (PR2) forms a third shaft, sun gears of gearsets (PR1, PR2) are connected for forming a fourth shaft, and carrier of gearset (PR2) couples the housing. The first shifting element is arranged in the force flow between the third shaft and the housing, the third shifting element is arranged in the force flow between the second and third shafts, and the second shifting element is arranged in the force flow either between the first and second shafts or the second and fourth shafts.

13 Claims, 4 Drawing Sheets

(56) References Cited

U.S. PATENT DOCUMENTS

| | | |
|---|---|---|
| 8,454,473 B2 | 6/2013 | Reitz |
| 8,491,438 B2 | 7/2013 | Kim et al. |
| 8,795,124 B2 * | 8/2014 | Oberaigner ........ B60K 17/3467 475/204 |
| 2001/0012810 A1 | 8/2001 | Ohkubo |
| 2012/0196716 A1 * | 8/2012 | Rosemeier ........... B60K 17/165 475/205 |

FOREIGN PATENT DOCUMENTS

| | | |
|---|---|---|
| DE | 691 06 861 T2 | 6/1995 |
| DE | 696 09 294 T2 | 2/2001 |
| DE | 10 2005 058 226 A1 | 7/2006 |
| DE | 10 2010 024 147 A1 | 1/2011 |
| DE | 10 2010 061 054 A1 | 3/2012 |

* cited by examiner

| Gear | Shifting elements closed | | | Transmission ratio i | Gear interval φ |
|---|---|---|---|---|---|
| | Brake | Clutch | | | |
| | B03 | K12 | K23 | | |
| 1 | | | X | 2,000 | |
| | | | | | 1,481 |
| 2 | X | | | 1,350 | |
| | | | | | 1,350 |
| 3 | | X | | 1,000 | |

Fig. 7

TRANSMISSION

This application claims priority from German patent application serial no. 10 2013 226 473.9 filed Dec. 18, 2013.

FIELD OF THE INVENTION

The present invention concerns a transmission, in particular a three-gear transmission for a motor vehicle, preferably for use in a drive-train for electric vehicles or in a drive-train for hybrid vehicles. The present invention also concerns a method for operating such a transmission and a drive-train with such a transmission.

BACKGROUND OF THE INVENTION

Here, 'transmission' denotes a multi-gear transmission in which a predefined number of gears, i.e. fixed transmission ratios between the transmission input and the transmission output, can be engaged automatically by means of shifting elements. The shifting elements are for example clutches and/or brakes.

At present, as drive systems for electric vehicles single-gear transmissions are mainly used, i.e. simple step-down stages with an output rotational speed lower compared with the input rotational speed. With such a structure, however, the electric drive must cover the complete rotational speed range and this reduces its overall efficiency. Furthermore, the rotational speed range that can be realized is rather narrow.

It has therefore already been proposed to use two-gear transmissions as drive systems for electric vehicles. However, until now these have been designed as conventional manual-shift transmissions with sliding sleeves. If such a transmission is used the electric machine can be made smaller, and this results in a clear cost advantage. However, precisely because the transmission is made with sliding sleeves, there is a traction force interruption during the shift. For automated drive-trains, however, such a traction force interruption results in a considerable impairment of comfort, which is undesired by the customer or the driver.

DE 10 2010 024 147 A1 discloses a two-gear transmission for transmitting drive torque in a drive-train of a vehicle, preferably for use in a drive-train for electric vehicles, in a drive-train for hybrid vehicles or in an auxiliary drive-train for hybrid vehicles, by virtue of such a transmission, gear-shifts can be carried out without traction force interruption or with less traction force interruption, by virtue of two automated and controllable clutches.

DE 10 2010 061 054 A1 discloses a drive-train for a hybrid vehicle, with which three or more fixed transmission ratio modes can be produced, this drive-train comprises a first and a second motor-generator, two individual planetary gearsets and four torque-transmitting elements.

SUMMARY OF THE INVENTION

The purpose of the present invention is to propose a transmission of the type mentioned at the beginning, which has small gear intervals within a large transmission spread and which, at the same time, is optimized in relation to the fitting space required and/or has high efficiency.

'Transmission spread' is understood to mean the quotient of the transmission ratio of the lowest gear and the transmission ratio of the highest gear, the lowest gear having the largest transmission ratio and the highest gear the lowest transmission ratio. If a transmission ratio i<1.0 the ratio is a step-up ratio, i.e. the rotational speed at the transmission output will be higher than the rotational speed at the transmission input.

According to the invention, the objective is achieved with a transmission according to the description below.

According to these a transmission according to the invention is proposed which comprises a drive input shaft, a drive output shaft, a housing, at least two planetary gearsets and at least three shifting elements, whose selective engagement produces various transmission ratios between the drive input shaft and the drive output shaft, in such manner that at least three gears can be obtained.

According to the invention a ring gear of the first planetary gearset and the drive input shaft are connected to one another in a rotationally fixed manner, forming a first rotary shaft of the transmission. A carrier of the first planetary gearset and the drive output shaft are connected to one another in a rotationally fixed manner, forming a second rotary shaft of the transmission. A ring gear of the second planetary gearset forms a third rotary shaft of the transmission. A sun gear of the first planetary gearset and a sun gear of the second planetary gearset are connected to one another in a rotationally fixed manner and form a fourth rotary shaft of the transmission. A carrier of the second planetary gearset is coupled to the housing of the transmission in a rotationally fixed manner.

Regarding the connections of the shifting elements to the various elements of the planetary gearsets of the transmission, according to the invention it is proposed that the first shifting element is arranged in the force flow between the third shaft and the housing of the transmission, and the third shifting element is arranged in the force flow between the second and third shafts of the transmission. According to the invention, the second shifting element is arranged in the force flow either between the first shaft and the second shaft, or between the second shaft and the fourth shaft. Thus, by virtue of these different kinematic couplings of the shifting elements to the various shafts of the transmission, according to the invention a corresponding transmission family is obtained.

The planetary gearsets are preferably in the form of so-termed minus planetary gearsets. A minus planetary gearset comprises a planetary carrier on which planetary gearwheels are mounted to rotate, a sun gear and a ring gear, wherein the teeth of at least one of the planetary gearwheels mesh both with the teeth of the sun gear and with the teeth of the ring gear, whereby the ring gear and the sun gear rotate in opposite rotational directions when the sun gear is rotating while the planetary carrier is fixed.

A plus planetary gearset differs from the minus planetary gearset described above, in that the plus planetary gearset has both inner and outer planetary gearwheels mounted to rotate on the planetary carrier. The teeth of the inner planetary gearwheels mesh on one side with the teeth of the sun gear and on the other side with the teeth of the outer planetary gearwheels. Moreover, the teeth of the outer planetary gearwheels mesh with the teeth of the ring gear. As a result, when the planetary carrier is fixed the ring gear and the sun gear rotate in the same direction.

The structure of the two planetary gearsets according to the invention as minus planetary gearsets has been shown to be a particularly economical production option. At the same time this arrangement has high efficiency in relation to the gearset. Provided that connectability permits, as an alternative embodiment at least one minus planetary gearset can be changed to a plus planetary gearset. At the same time, however, this requires the planetary carrier and ring gear connections to be interchanged and the value of the fixed transmission ratio to be increased by 1. In this context the fixed transmission ratio is the transmission ratio between the sun gear and the ring gear when the planetary carrier is not moving.

The use of planetary gearsets makes it possible to produce particularly compact transmissions, which allows great freedom when arranging the transmission in a vehicle.

As regards the spatial arrangement of the two planetary gearsets in the transmission, in an advantageous design it is proposed to arrange the two planetary gearsets coaxially with one another.

The geometrical position of the individual planetary gearsets and shifting elements can be chosen freely provided that it allows the connectability of the elements. This means that the position of individual elements in the housing can be changed as desired, provided that the individual connecting elements or shafts do not cross. This also includes the possibility that planetary gearsets can be arranged radially over one another or even axially one behind another for example along the drive input shaft. In this context 'connectability' is understood to mean that with a different geometrical positioning, i.e. with a component arrangement different from the one just described, the same connections or interconnections of the interfaces are ensured without any crossing of individual connecting elements or shafts.

The shifting elements of the transmission according to the invention can in each case be in the form of frictional shifting elements, i.e. friction clutches or friction brakes, for example disk clutches, disk brakes or band brakes, or in the form of interlocking shifting elements, i.e. interlocking clutches or interlocking brakes such as unsynchronized or synchronized claw clutches or claw brakes, or cone clutches or cone brakes.

Furthermore, the shifting elements are preferably arranged so as to be easily accessed from outside. Easily accessed from outside means, in the context of shifting elements, that no further components are arranged between the housing and the shifting element, or that the shifting elements are preferably arranged on the drive input shaft or the drive output shaft.

Clutches are shifting elements which, depending on their actuation state, allow relative movement between at least two components or alternatively produce a rotationally fixed connection between them for the transfer of load or torque. Relative movement is understood to mean for example rotation of at least two components of the clutch such that the rotational speed of the first component and that of the second component are different, i.e. a rotational speed difference exists. Moreover the rotation of only one of the components is conceivable, while the other component is static or rotating in the opposite direction.

In what follows, a non-actuated clutch is understood to be an open clutch. This means that relative movement between the two components is possible. When the clutch is actuated or closed, the two components will correspondingly rotate at the same speed and in the same direction.

A brake is understood to be a shifting element connected on one side to a fixed element, for example a housing, and on another side to an element that can rotate. In what follows, a non-actuated brake is understood to be an open brake. This means that the rotating component can rotate freely, i.e. the brake preferably has no influence on the rotational speed of the rotating component. When the brake is actuated or closed, the rotational speed of the rotating component is reduced to zero, i.e. a connection can be formed between the rotating element and the fixed element.

Basically shifting elements can also be used, which are closed in the non-actuated state and open when actuated. Correspondingly, the association between the function and the actuation state of the actuation states described above is to be understood the other way round. In the example embodiments that follow, however, an arrangement is first assumed in which an actuated shifting element is closed and a non-actuated shifting element is open.

The shifting elements can for example be designed to be actuated hydraulically, pneumatically or electro-mechanically.

Preferably the first shifting element is in the form of a first brake, the second shifting element in the form of a first clutch and the third shifting element in the form of a second clutch.

In particular, by means of the transmission according to the invention three gears can be obtained, the first gear by closing the third shifting element, the second gear by closing the first shifting element and the third gear by closing the second shifting element. Thus, in each gear only one shifting element is actuated whereas the other two shifting elements are not actuated.

Accordingly, to obtain a gear, one shifting element is closed and the other shifting elements are open, so that a gearshift to an adjacent higher gear or to an adjacent lower gear takes place in each case by closing a previously open shifting element and opening the previously closed shifting element.

Depending on the rotational direction of the drive input shaft of the transmission, the first, second and third gears of the transmission can be obtained as forward gears or as reversing gears. Thus, the gears of the transmission can be used as forward gears with a first rotational direction of the drive input shaft, whereas when the drive input shaft rotates in a second direction opposite to the first rotational direction, the gears of the transmission can be obtained as reversing gears. For the forward gears and the reversing gears, the shifting elements and the shifting condition of the shifting elements are identical. In this way no separate transmission components are needed for the reversing gears.

In a particularly advantageous embodiment all the shifting elements of the transmission according to the invention are in the form of frictional shifting elements. This structure of all the shifting elements as friction shifting elements enables the transmission according to the invention to have full powershifting ability, where this is understood to mean that at least the sequential gear changes can be carried out as powershifts, and this indeed, both as upshifts and downshifts and both during traction and during overdrive operation.

In a further, particularly advantageous embodiment of the transmission according to the invention, the second and third shifting elements are interlocking and only the first shifting element is frictional. In this way, compared with the version in which all the shifting elements are frictional, the structural complexity of the shifting elements is reduced. The frictional shifting element is in this case preferably the one that has to be closed for a gearshift from the first to the second gear, or opened for a gearshift from the second to the first gear, whereby a traction upshift from the first to the second gear or a traction downshift from the second to the first gear can be carried out as powershifts.

If only the first shifting element is frictional, it is advantageous to design the second gear of the transmission according to the invention as the main driving gear, since in the second gear the frictional shifting element is closed and therefore causes no drag losses, so that the efficiency is improved.

In a further version of the invention the transmission ratios of the first and second gears can be chosen such that they cover the complete speed range of the vehicle. The third gear is then designed to be a so-termed coasting or overdrive gear, whereby at higher speeds in the third gear the rotational speeds are lower. A traction upshift from the first to the second gear or a traction downshift from the second to the first gear can then be carried out in the working performance range as powershifts.

To achieve further savings of component costs, fitting space and weight, in a further preferred embodiment of the invention it can be provided that two shifting elements which are never closed simultaneously or with a time overlap, are combined as a dual shifting element in a shifting packet that can be actuated bilaterally. The shifting elements of this shifting packet can preferably be in the form of inexpensive claw clutches or claw brakes. To actuate the shifting packet or dual shifting element, only one actuator that works in two directions is then needed.

Assuming that the first shifting element is frictional and the second and third shifting elements are interlocking and are combined in a dual shifting element, in a further preferred design of the invention the frictional shifting element is designed as a "normally open" shifting element, which means that in its non-actuated condition the shifting element is kept in the open condition for example by spring force, and to produce the closed condition the shifting element has to be continuously actuated by an actuator. In this way, if the actuator system malfunctions blocking of the transmission is securely avoided since a simultaneous engagement of two transmission gears is excluded. When the frictional shifting element is in the form of a friction brake no rotation transfer is necessary as would be the case with a friction clutch, since the actuation of the friction brake can take place while it is fixed relative to the housing. This reduces transmission losses, which has a very advantageous effect particularly in electric drives.

In a further development, a freewheel can be arranged between at least one shaft of the transmission and the housing of the transmission, or between at least one shaft of the transmission and another shaft of the transmission.

In a preferred embodiment a planetary gearset can be connected upstream from the transmission according to the invention, which comprises at least a sun gear, a planetary gearwheel, a planetary carrier and a ring gear. Preferably, the upstream planetary gearset is designed as a minus planetary gearset. The sun gear of this planetary gearset then forms a fifth shaft of the transmission, which is or can be connected in a rotationally fixed or rotationally elastic manner to a drive output shaft of a drive aggregate. The ring gear is preferably formed as a rotationally fixed element and can for example be connected rotationally fixed to the housing of the transmission or made integrally with it. The carrier of the upstream planetary gearset is preferably connected to the first shaft of the downstream transmission and therefore also to the ring gear of the first planetary gearset. By virtue of the upstream planetary gearset the drive torque of the drive aggregate can be correspondingly increased. In a different embodiment the upstream planetary gearset can also be made as a plus planetary gearset.

In an advantageous further development, the transmission according to the invention can be the main transmission of a group transmission in which the main transmission is associated with at least one further upstream and/or downstream transmission ratio step. A transmission ratio step in drive connection downstream from the main transmission can preferably be designed as a range group, whereas a transmission ratio step in drive connection upstream from the main transmission can preferably be designed as a splitter group. By means of a two-step splitter group, which can also be called the upstream group, the transmission ratio intervals between the gear steps of the main transmission can be approximately halved and thereby the total number of gears available can be doubled. By means of a two-step range group, which can also be called the downstream group, the spread of the transmission as a whole is substantially increased and the total number of gears available can again be doubled. The upstream or downstream transmission ratio steps can for example be in the form of a spur gear pair or a planetary gearset.

The drive input shaft and the drive output shaft of the transmission and the transmission input and transmission output are preferably arranged coaxially with one another. However, the drive input shaft and the drive output shaft of the transmission and the transmission input and transmission output can also be designed such that they are arranged axis-parallel or at an inclination to one another. It is also possible for the transmission input and transmission output to be arranged on opposite sides of the transmission housing or on the same side thereof. This allows the transmission to be adapted for various fitting situations.

According to a further aspect of the present invention, an axle differential, a transfer box and/or a clutch can be arranged on the drive input side or on the drive output side of the transmission.

In a further embodiment of the invention, an auxiliary power take-off can be provided on any shaft of the transmission for driving additional aggregates, preferably on the drive input shaft or on the drive output shaft.

A further advantage of the transmission proposed here is that in principle, an additional electric machine or some other force/power source can be arranged on any shaft of the transmission. This additional electric machine or other force/power source can be used, for example, for synchronizing elements of the transmission.

The method according to the invention for operating a transmission according to the invention as described above provides that to obtain the three gears of the transmission, in each gear only one shifting element is closed and the other two shifting elements are open. Regardless of whether the shifting elements are actuated hydraulically, pneumatically, electro-mechanically or in some other way, this results in low energy uptake of the shifting elements which ultimately has an advantageous effect on the consumption for example of fuel by an internal combustion engine as the source of drive power for the vehicle. A gearshift to an adjacent higher gear or to an adjacent lower gear is in each case carried out by closing one of the previously open shifting elements and opening the previously closed shifting element.

In a preferred version of the method according to the invention, at least a traction upshift from the first to the second gear, a traction downshift from the second gear to the first gear, an overdrive upshift from the second to the third gear and an overdrive downshift from the third gear to the second gear are carried out as powershifts. During the traction upshift from first to second gear and during the overdrive downshift from third to second gear a load takeover by the friction shifting element to be closed during the gearshift can take place in such manner that an interlocking shifting element which is to be opened during the gearshift can be disengaged while free from load. During the traction downshift from second to first gear and during the overdrive upshift from second to third gear, a load can be maintained by a frictional shifting element that has to be opened, in such manner that an interlocking shifting element that has to be closed during the gearshift can be engaged while free from load.

Besides a transmission according to the invention as described earlier, the drive-train according to the invention comprises at least a drive aggregate wherein the drive input shaft of the transmission is or can be connected in a rotationally fixed or rotationally elastic manner to a drive output shaft of the drive aggregate.

In a particularly preferred embodiment, the drive aggregate is in the form of an electric machine which can be operated both as a motor and as a generator. In this preferred embodiment, depending on the rotational direction of the electric machine or the rotational direction of the drive input shaft of the transmission, the first, second and third gears of the transmission according to the invention can be obtained as forward gears or as reversing gears. Thus, when the electric machine is rotating in a first direction, the gears of the transmission can be used as forward gears, whereas if the electric machine is switched so as to rotate in a second direction opposite to the first rotational direction, the gears of the transmission are used as reversing gears. The shifting elements and their shifting conditions for the forward gears and for the reverse gears are identical. Accordingly, no separate transmission components for the reversing gears are needed. This drive-train is particularly suitable for an electric vehicle in which the electric machine can be connected by way of the transmission to drive wheels of the electric vehicle. Between the transmission and the drive wheels of the motor vehicle, for example a differential transmission such as an axle transmission can be arranged.

In a further preferred embodiment, the drive-train is designed as a hybrid drive-train and comprises an internal combustion engine in addition to the above-mentioned electric machine. This drive-train is particularly suitable for a hybrid vehicle in which both the internal combustion engine and the electric machine can be connected by way of the transmission to the drive wheels of the hybrid vehicle. Between the internal combustion engine and the transmission, in a conventional manner a controllable friction clutch can be arranged, by means of which the driveshaft of the internal combustion engine can be connected to the drive input shaft of the transmission. The friction clutch can be used as a separator and starting clutch and also as synchronization means during gearshift processes. Alternatively, a hydrodynamic torque converter can be arranged between the internal combustion engine and the drive input shaft of the transmission as the starting element. Furthermore, here too for example a differential transmission such as an axle transmission can be arranged between the transmission and the drive wheels of the motor vehicle.

BRIEF DESCRIPTION OF THE DRAWINGS

Below, examples of the invention will be explained in greater detail with reference to the attached figures, which show:

FIG. 7: An example shifting scheme.

DETAILED DESCRIPTION OF THE DRAWINGS

Figure 1:
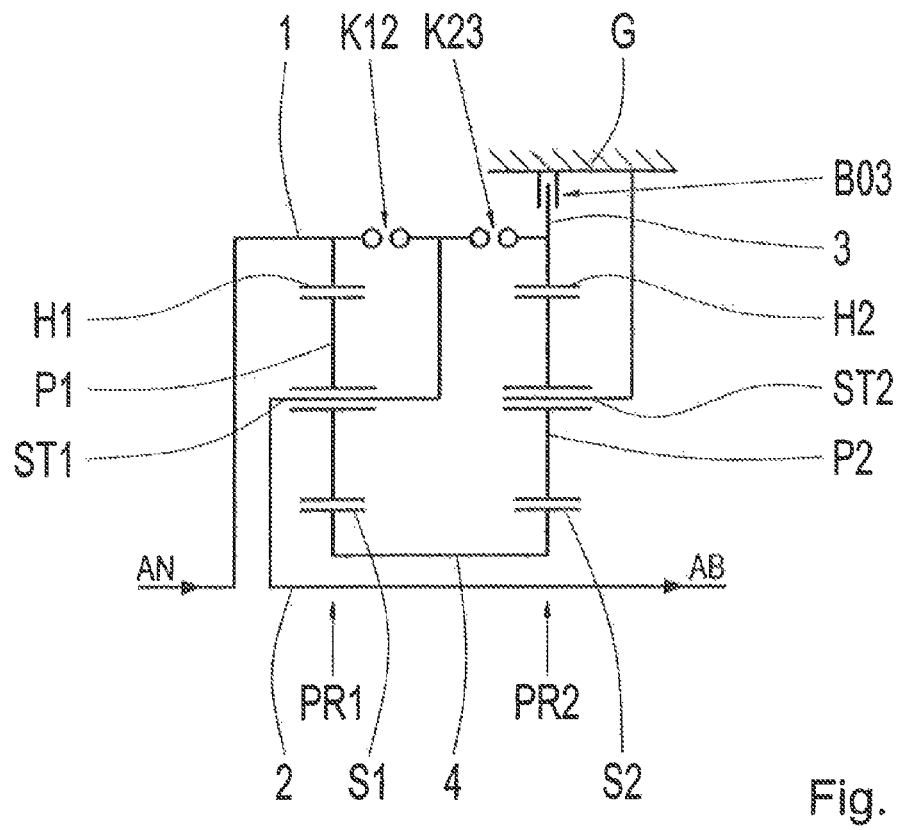
FIG. 1: A schematic view of a first embodiment of a transmission according to the invention.

FIG. 1 shows a schematic representation of a first embodiment of the transmission according to the invention, in which the transmission comprises a drive input shaft AN, a drive output shaft AB, a first planetary gearset PR1, a second planetary gearset PR2 and three shifting elements B03, K12, K23, all of them accommodated in a housing G of the transmission. In this example embodiment both of the planetary gearsets PR1, PR2 are simple minus planetary gearsets. According to the invention, at least one of the planetary gearsets PR1, PR2 can be designed as a plus planetary gearset, provided that at the same time the carrier and ring gear connections are interchanged and, compared with the minus planetary gearset version, the value of the fixed transmission ratio is increased by 1. The ring gears of the two planetary gearsets PR1, PR2 are indexed H1 and H2, their sun gears S1 and S2, their planetary gearwheels P1 and P2 and the carriers, on which the planetary gearwheels P1, P2 are mounted to rotate, are indexed ST1 and ST2, respectively. The transmission according to the invention comprises four rotary shafts, which are indexed 1 to 4.

Regarding the coupling of the individual elements of the two planetary gearsets PR1, PR2 with one another and to the drive input shaft AN and the drive output shaft AB, in the transmission according to FIG. 1 the following provisions are made: the ring gear H1 of the first planetary gearset PR1 and the drive input shaft AN are connected to one another in a rotationally fixed manner and form the first rotary shaft 1 of the transmission. The carrier ST1 of the first planetary gearset PR1 and the drive output shaft AB are connected to one another in a rotationally fixed manner and form the second rotary shaft 2 of the transmission. The ring gear H2 of the second planetary gearset PR2 forms the third rotary shaft 3 of the transmission. The sun gear S1 of the first planetary gearset PR1 and the sun gear S2 of the second planetary gearset PR2 are connected to one another in a rotationally fixed manner and form the fourth rotary shaft 4 of the transmission, and the carrier ST2 of the second planetary gearset PR2 is coupled to the housing G of the transmission in a rotationally fixed manner.

Regarding the coupling of the three shifting elements B03, K12, K23 to the shafts 1 to 4 of the transmission described above, in the transmission according to FIG. 1 the following provisions are made: the shifting element B03 is arranged in the force flow between the third shalt 3 and the housing G of the transmission, the shifting element K23 is arranged in the force flow between the second shaft 2 and the third shaft 3, and the second shifting element K12 is arranged in the force flow between the first shaft 1 and the second shaft 2.

In the example embodiment shown in FIG. 1, the two planetary gearsets PR1, PR2 are arranged coaxially one behind the other, such that the first planetary gearset PR1 is the gearset of the transmission which is nearest to the drive input side and the second planetary gearset is the gearset of the transmission which is nearest to the drive output side. The drive input shaft AN and the drive output shaft AB of the transmission, as well as the transmission drive input and the transmission drive output, are positioned on opposite sides of the transmission. The geometrical positions of the two planetary gearsets PR1, PR2 and the spatial arrangement of the shifting elements A, B, C, however, can be freely chosen provided that they permit the connectability of the elements.

The three shifting elements B03, K12, K23 are, respectively, a first brake B03, a first clutch K12 and a second clutch K23. In the example embodiment shown, the shifting element B03, which is a brake, is a frictional shifting element, whereas the shifting elements K12 and K23, which are clutches, are interlocking shifting elements. With these three shifting elements B03, K12. K23 three gears can be engaged selectively.

By virtue of such a design of the shifting elements B03, K12, K23, the structural complexity of the shifting elements can be correspondingly reduced as compared with an embodiment in which all the shifting elements B03, K12, K23 are frictional. A traction upshift from the first to the second gear, a traction downshift from the second to the first gear, an overdrive upshift from the second to the third gear and an overdrive downshift from the third to the second gear can advantageously be carried out as powershifts, since the brake B03 to be closed or opened during these gearshifts is a friction brake.

In the example embodiment shown in FIG. 1, as viewed spatially all three shifting elements B03, K12, K23 are arranged in an area radially between the planetary gearsets PR1 PR2 and the housing G of the transmission, wherein the two shifting elements K12, K23 in the form of clutches are positioned between the two planetary gearsets PR1, PR2 in the axial direction. The rotationally fixed coupling of the carrier ST2 of the second planetary gearset PR2 to the housing G of the transmission, viewed spatially, is arranged on the side of the second planetary gearset PR2 facing away from the first planetary gearset PR1.

Figure 2:
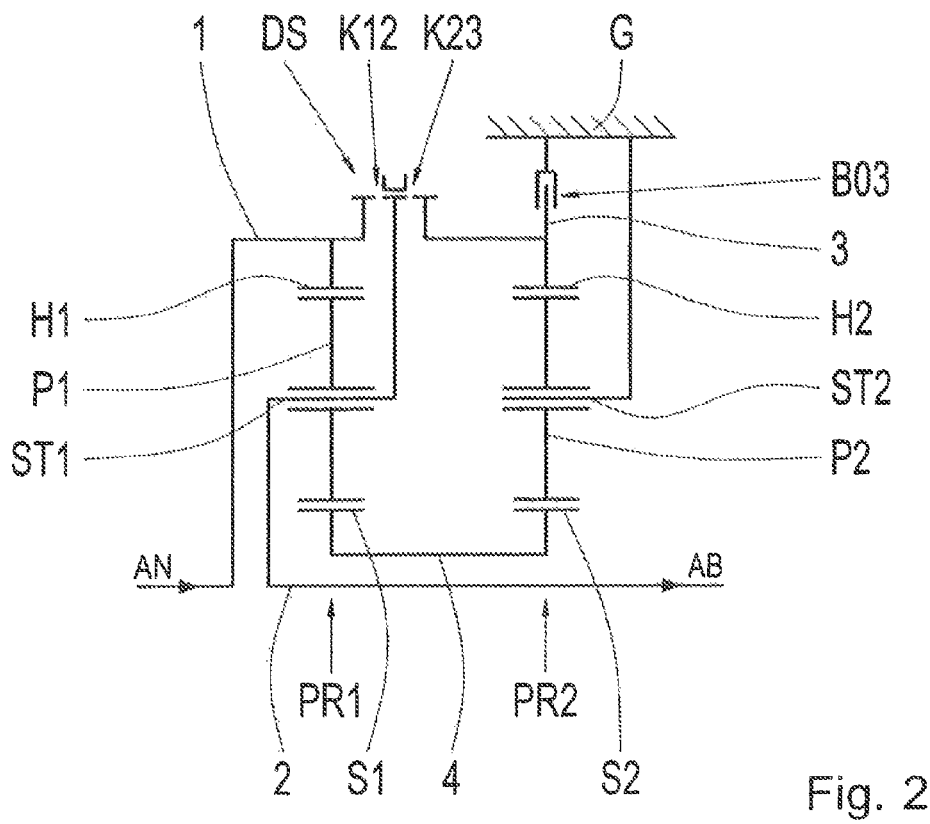
FIG. 2: A schematic view of a second embodiment of a transmission according to the invention.

FIG. 2 shows a further design form of the transmission described in FIG. 1, wherein only the differences from the embodiment of FIG. 1 will be discussed. Otherwise than in the embodiment described in FIG. 1, in the embodiment of the transmission according to the invention shown in FIG. 2 the two shifting elements K12, K23, both formed as interlocking clutches, are combined in a common shifting packet as a dual shifting element DS. Accordingly, for the actuation of the two shifting elements K12, K23, advantageously only one actuator is needed, which can be operated in a first and in a second actuation direction.

Figure 3:
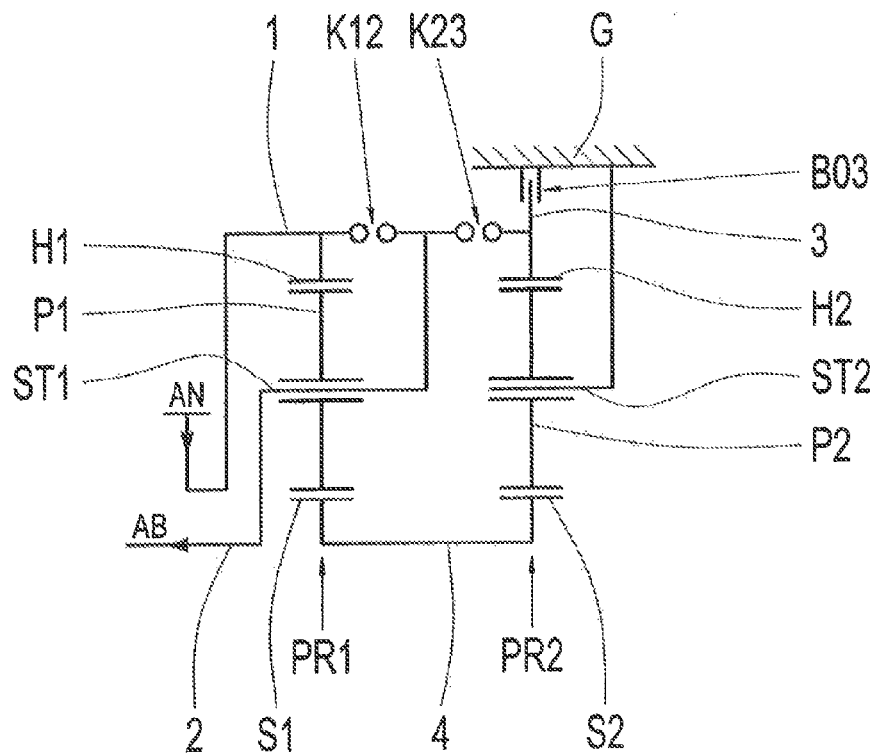
FIG. 3: A schematic view of a third embodiment of a transmission according to the invention.
Figure 4:
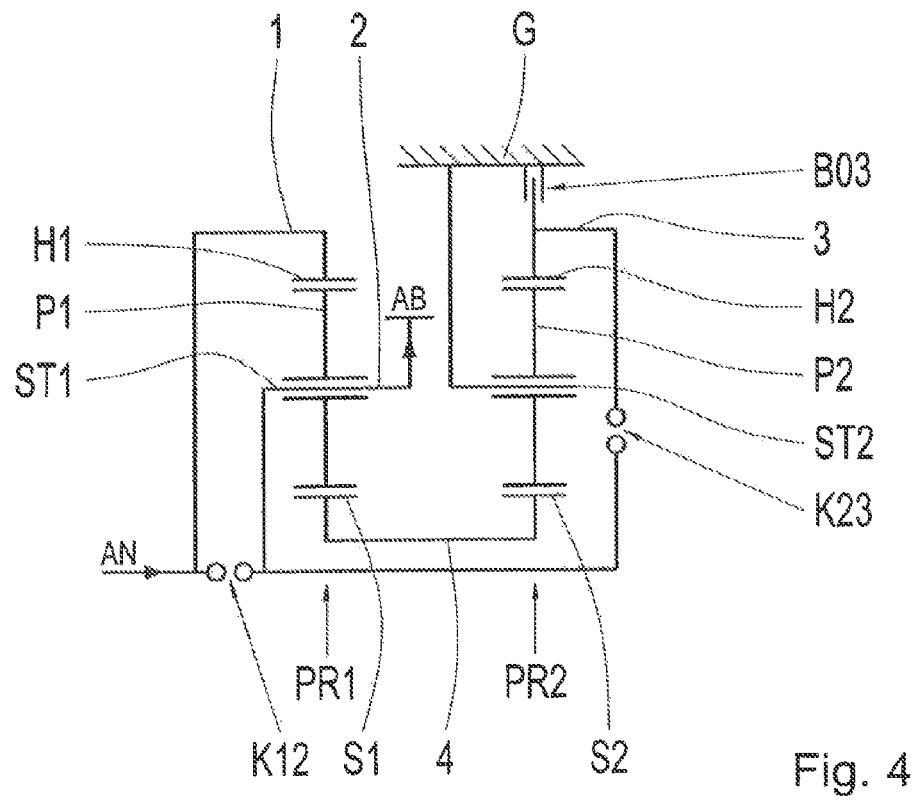
FIG. 4: A schematic view of a fourth embodiment of a transmission according to the invention.

FIGS. 3 and 4 each show a further design form of the transmission described in FIG. 1, wherein only the differences from the embodiment of FIG. 1 will be discussed. In contrast to the embodiment described in FIG. 1, in the embodiment of the transmission according to the invention shown in FIG. 3 the transmission input and the transmission output are arranged on the same side of the transmission housing and at an angle to one another. In the embodiment of the transmission according to the invention shown in FIG. 4, the transmission output is arranged between the first and second planetary gearsets PR1, PR2 and at an angle to the transmission input. Furthermore, as viewed spatially the rotationally fixed coupling of the carrier ST2 of the second planetary gearset PR2 to the housing G of the transmission is arranged between the first and second planetary gearsets PR1 PR2, and the spatial arrangement of the two shifting elements in the form of clutches K12, K23 has been adapted correspondingly. Thus, the shifting element K12 is now arranged between the transmission input AN and the first planetary gearset PR1, while the shifting element K23 is arranged on the side of the second planetary gearset PR2 facing away from the first planetary gearset PR1.

Figure 5:
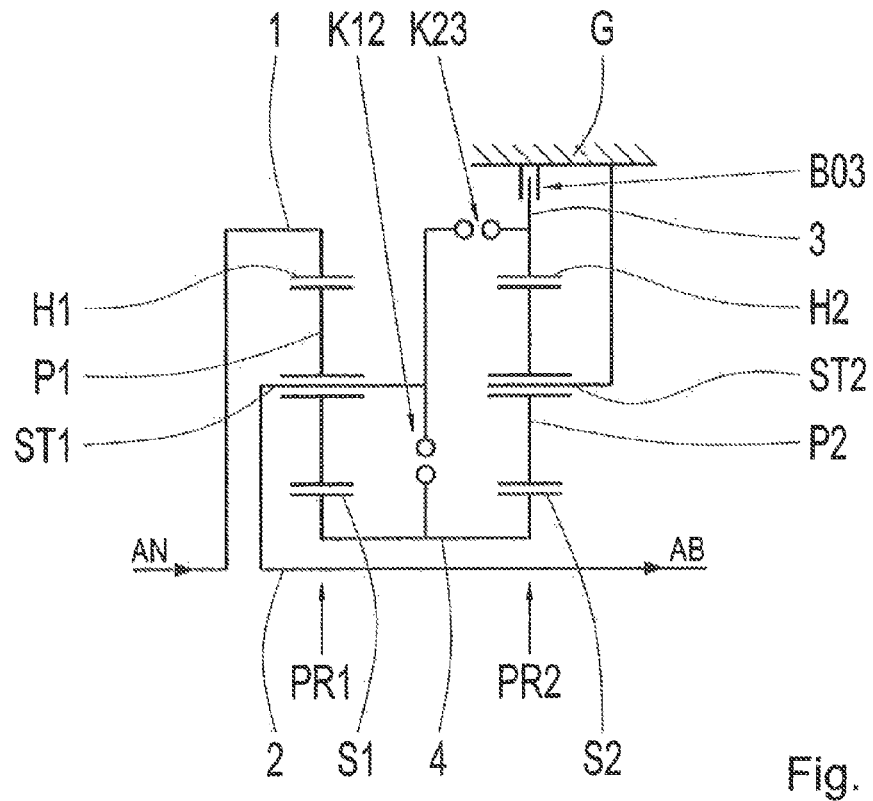
FIG. 5: A schematic view of a fifth embodiment of a transmission according to the invention.

Starting from the consideration that when engaged or closed, the clutch K12 that engages with interlock locks the first planetary gearset PR1, in the example embodiment of the transmission according to the invention shown in FIG. 5 another possibility is indicated for locking the first planetary gearset PR1 by means of the clutch K12 that engages with interlock. The transmission layout illustrated schematically in FIG. 5 differs from the transmission layout shown in FIG. 1 in that the interlocking clutch K12 is now arranged in the force flow between the second shaft 2 and the fourth shaft 4. Thus, in its engaged or closed condition the interlocking clutch K12 now connects the sun gear S1 and the carrier ST1 of the first planetary gearset PR1 to one another.

Accordingly, depending on the arrangement options of the interlocking clutch K12 described above, the first planetary gearset PR1 can be locked in two different ways.

Figure 6:
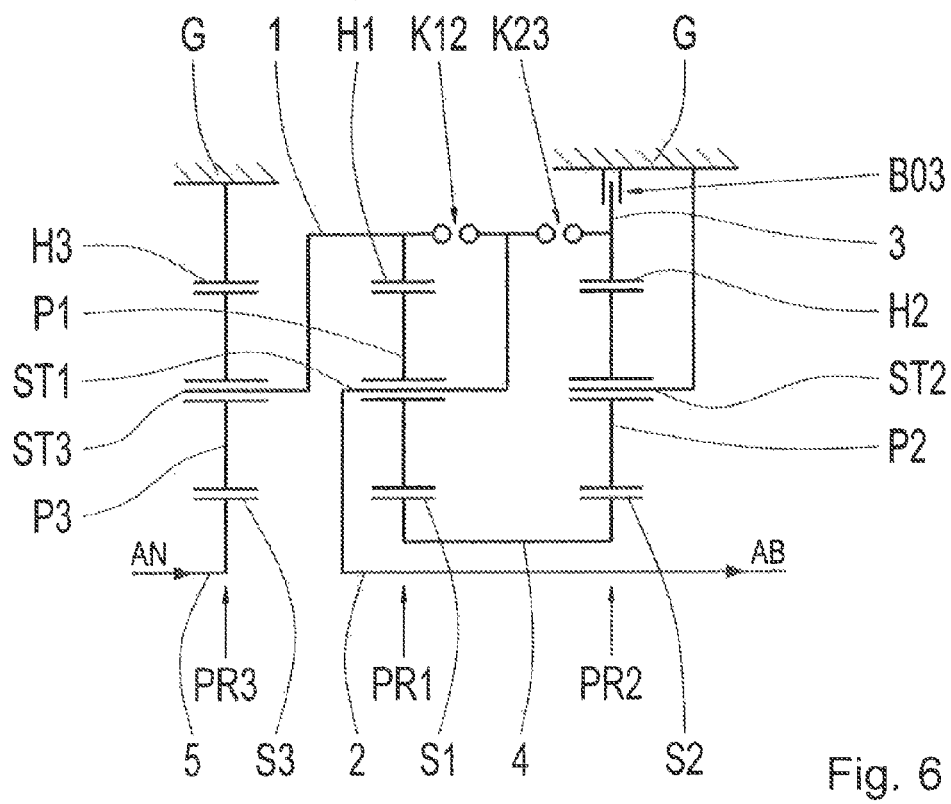
FIG. 6: A schematic view of a further embodiment of a transmission according to the invention.

The transmission illustrated schematically in FIG. 6 differs from the transmission of FIG. 1 in that the transmission comprises a planetary gearset PR3 connected upstream from it. The planetary gearset PR3 comprises a sun gear S3, a planetary gearwheel P3 and a ring gear H3. The sun gear S3 forms a fifth shaft 5 which is or can be connected in a rotationally fixed or rotationally elastic manner to an output shaft of a drive aggregate (not shown here) such as an electric machine. The ring gear H3 is designed as a rotationally fixed element and in this case is connected rotationally fixed to the housing G of the transmission. A carrier ST3 of the planetary gearset PR3 is connected rotationally fixed to the first shaft 1 of the downstream transmission and thus also to the ring gear H1 of the first planetary gearset PR1. By means of the upstream planetary gearset PR3, here in the form of a minus planetary gearset, the drive torque of the drive aggregate can be increased.

FIG. 7 shows in tabular form an example of a shifting scheme for the transmission according to the invention shown in FIGS. 1 to 6. An X in any field indicates which of the shifting elements is closed in order to obtain the individual gears. The first gear can be obtained by closing the second clutch K23, the second gear by closing the first brake B03 and the third gear by closing the first clutch K12.

In addition the table also indicates as examples the respective transmissions of the gears concerned, the first gear having a transmission ratio of i=2.0, the second gear a transmission ratio of i=1.35 and the third gear a transmission ratio of i=1.0. Thus, the third gear can be designed as a so-termed direct gear. In the above, 'transmission' and 'transmission ratio' have the same meaning.

The transmission ratios of the first gear and of the second gear can preferably be chosen such that they cover the full speed range of the vehicle, whereby a gearshift from the first to the second gear as a traction upshift or from the second to the first gear as a traction downshift in the working performance range can always be carried out as a powershift. The third gear can be designed as a so-termed overdrive gear, so that at higher speeds in the third gear the rotational speeds will be lower. This improves the efficiency and reduces noise.

Depending on the rotational direction of the drive input shaft of the transmission, the first, second and third gears of the transmission can be obtained as forward gears or as reversing gears. Thus, the gears of the transmission can be used as forward gears with a first rotational direction of the drive input shaft, whereas when the drive input shaft rotates in a second direction opposite to the first rotational direction, the gears of the transmission can be obtained as reversing gears. For the forward gears and the reversing gears the shifting elements and the shifting condition of the shifting elements are identical. In this way no separate transmission components are needed for the reversing gears.

Furthermore, the table of FIG. 7 shows the corresponding gear intervals of the gears. A gear interval is understood to mean the quotient of the transmission ratio of a gear and of a next-higher gear. In this case the gear interval from the first gear to the second gear has a value of ϕ=1.481 and the gear interval from the second to the third gear has a value of ϕ=1.35.

Below, for an electric vehicle or a hybrid vehicle examples of various gearshifts are described having regard to the shift types traction upshift, traction downshift, overdrive upshift and overdrive downshift, on the assumption that only the brake B03 is a frictional shifting element and the two clutches K12 and K23 are interlocking shifting elements.

As already mentioned a traction upshift, i.e. an upshift while the engine torque is positive, from the first to the second gear can be carried out as a powershift since the brake B03 that has to be closed for the gearshift from first to second gear is a friction brake. During the traction upshift from the first to the second gear, at the closing friction brake B03 a rotational speed difference is produced, whereby a load transfer by way of the friction brake B03 can take place so that the interlocking clutch K23 to be opened during the gearshift can be disengaged while free from load. Then a rotational speed adaptation to the new second gear takes place and the friction brake B03 to be closed is fully closed. Thus, the traction upshift from first to second, which occurs frequently during driving operation, can be carried out as a powershift.

A traction upshift from the second to the third gear is carried out as a traction force interrupting shift since the clutch K12 to be closed during the gearshift from second to third gear is an interlocking shifting element so that there can be no load uptake by the clutch K12 when there is a rotational speed difference. In this case a traction force interrupting shift is acceptable, since this preferably occurs at already higher speeds, when the traction force is therefore lower.

A traction downshift, i.e. a downshift while the engine torque is positive, from the second to the first gear, can be carried out as a powershift since the brake B03 to be opened during the gearshift from second to first gear is a frictional brake. During the traction downshift from second to first gear a rotational speed difference is produced at the frictional brake B03 being opened, whereby at first a load can be partially maintained by the frictional brake B03 so that once the speed adaptation has taken place, the interlocking clutch K23 to be closed during the gearshift can be engaged while free from load. Then, the brake B03 to be opened is fully opened and the already engaged clutch K23 takes up the load. The ability to carry out the downshift from the second to the first gear as a powershift is very advantageous since at low driving speeds the traction force can be increased, as for example when an electric machine arranged on the transmission input is operated at a rotational speed lower than its so-termed transition speed and cannot bring its full power to bear.

A traction downshift from the third to the second gear is carried out as a traction force interrupting shift, since the clutch K12 to be opened during the gearshift from the third to the second gear is an interlocking clutch so that it cannot maintain any load when there is a speed difference. A traction force interrupting shift is acceptable in this case since it preferably only takes place at higher driving speeds and when the vehicle is slowing down. During a downshift from the third to the second gear a vehicle driver as a rule only requires little propulsion power so that not much traction force is called for. When driving with an electric machine as the drive aggregate, above the so-termed transition speed the full drive power is always available. Thus, even if the vehicle is slowing down because of an uphill slope, the full drive power is available so long as the rotational speed of the electric machine does not fall below the so-termed transition speed.

An overdrive downshift, i.e. a downshift while the engine torque is negative, from the third to the second gear can be carrier out as a powershift, since the brake B03 to be closed during the gearshift from third to second gear is a friction brake. During the overdrive downshift from the third to the second gear a speed difference is produced at the closing friction brake B03, whereby a load transfer by the brake B03 can take place so that the interlocking clutch K12, which has to be opened during this gearshift, can be disengaged while free from load. There is then a rotational speed adaptation to the new second gear and the friction brake B03, which has to be closed during the gearshift from third to second gear, is fully closed. The ability to carry out the overdrive downshift from third to second gear as a powershift is very advantageous, since during electrical braking, i.e. recuperation, the vehicle slows down but by virtue of the overdrive downshift the electric machine can again be operated at a higher rotational speed. Thanks to the overdrive downshift from third to second gear the rotational speed of the electric machine can be prevented from falling to its so-termed transition speed, below which the electric machine can no longer deliver its full power. In this way the electric machine is operated with greater efficiency.

An overdrive downshift from the second to the first gear is carried out as a traction force interrupting shift, since the clutch K23 to be closed during the gearshift from the second to the first gear is an interlocking shifting element and no load transfer can therefore take place by the clutch K23 when there is a rotational speed difference. In this case a traction force interrupting shift is acceptable since during electrical braking, i.e. recuperation, at that shifting point the vehicle becomes very slow and for reasons of comfort the full power of the electric machine can in any case not be called for.

An overdrive upshift, i.e. an upshift while the engine torque is negative, from the first to the second gear is carried out as a traction force interrupting shift, since the clutch K23 to be opened during the gearshift from the first to the second gear is an interlocking shifting element, so that it cannot maintain any load if there is a speed difference. A traction force interrupting shift is acceptable in this case, since overdrive upshifts from first to second gear occur rather seldom in practice, for example when the vehicle is accelerating downhill despite the thrust torque.

An overdrive upshift from the second to the third gear can be carried out as a powershift, since the brake B03 to be opened during the gearshift from second to third gear is a friction brake. During the overdrive upshift from the second to the third gear a rotational speed difference is produced at the friction brake B03 being opened, whereby a load can at first be partially maintained by the brake B03 so that, after rotational speed adaptation, the interlocking clutch K12 to be closed during this gearshift can be engaged while free from load. Thereafter the brake B03 to be opened is fully opened and the already engaged clutch K12 takes up the load.

Below, as an example a possible shift sequence is described. In the initial situation the transmission is in the first gear and the vehicle is accelerated by its drive aggregate because of a driver's demand for that. If the vehicle has reached a specifiable speed or if the drive input shaft of the transmission is rotating at a specifiable rotational speed, then a traction upshift takes place from the first to the second gear, which as already mentioned above, can be carried out as a powershift. In the second gear the vehicle is accelerated further by its drive aggregate. If the vehicle has reached a second specifiable speed or if the drive input shaft of the transmission is rotating at a second specifiable rotational speed, then a traction upshift takes place from the second to the third gear, which as already mentioned above, is carried out as a traction force interrupted shift. In the third gear the vehicle can be accelerated further by its drive aggregate. Thereafter, if the vehicle is braked for example because the driver has actuated the brake pedal, the vehicle decelerates and recuperation takes place. An overdrive downshift from the third to the second gear, which can be carried out as a powershift, is then triggered when the vehicle reaches a third specifiable speed or the drive input shaft of the transmission is rotating at a third specifiable rotational speed. To carry out this overdrive downshift from the third to the second gear as a powershift is very advantageous, since in that way there is no interruption of the recuperation. If the vehicle decelerates further, then the now engaged second gear can preferably remain engaged down to a vehicle speed of almost zero. If the driver again calls for increased drive power, for example by actuating an accelerator pedal, then a traction downshift takes place from the second to the first gear, which as already mentioned above, can be carried out as a powershift. Then the vehicle can be accelerated again in the first gear.

INDEXES

AN Drive input shaft
AB Drive output shaft
1 First shaft
2 Second shaft
3 Third shaft
4 Fourth shaft
5 Fifth shaft
G Housing
B03 First shifting element, first brake
K12 Second shifting element, first clutch
K23 Third shifting element, second clutch
DS Dual shifting element
PR1 First planetary gearset
PR2 Second planetary gearset
PR3 Third planetary gearset
S1 Sun gear of the first planetary gearset
S2 Sun gear of the second planetary gearset
S3 Sun gear of the third planetary gearset
P1 Planetary gearwheel of the first planetary gearset
P2 Planetary gearwheel of the second planetary gearset
P3 Planetary gearwheel of the third planetary gearset
H1 Ring gear of the first planetary gearset
H2 Ring gear of the second planetary gearset
H3 Ring gear of the third planetary gearset
ST1 Carrier of the first planetary gearset
ST2 Carrier of the second planetary gearset
ST3 Carrier of the third planetary gearset

The invention claimed is:
1. A transmission comprising:
a drive input shaft (AN),
a drive output shaft (AB),
a housing (G),
at least first and second planetary gearsets (PR1, PR2), and each of the first and the second planetary gearsets comprising a ring gear, a sun gear and a carrier,
at least first, second and third shifting elements (B03, K12, K23), and selective engagement of the first, the second and the third shifting elements producing various transmission ratios between the drive input shaft (AN) and the drive output shaft (AB) such that at least three gears are implementable,
the drive input shaft (AN) and the ring gear (H1) of the first planetary gearset (PR1) being connected to one another in a rotationally fixed manner for forming a first shaft (1),
the drive output shaft (AB) and the carrier (ST1) of the first planetary gearset (PR1) being connected to one another in a rotationally fixed manner for forming the second shaft (2),
the ring gear (H2) of the second planetary gearset (PR2) forming a third shaft (3),
the sun gear (S1) of the first planetary gearset (PR1) and the sun gear (S2) of the second planetary gearset (PR2) both being connected to one another in a rotationally fixed manner for forming a fourth shaft (4),
the carrier (ST2) of the second planetary gearset (PR2) being coupled to the housing (G) of the transmission in a rotationally fixed manner,
the first shifting element (B03) being arranged in a force flow between the third shaft (3) and the housing (G) of the transmission,
the third shifting element (K23) being arranged in a force flow between the second shaft (2) and the third shaft (3), and
the second shifting element (K12) being arranged in a force flow either between the first shaft (1) and the second shaft (2) or between the second shaft (2) and the fourth shaft (4).

2. The transmission according to claim 1, wherein a first gear is implemented by engagement of the third shifting element (K23),
a second gear is implemented by engagement of the first shifting element (B03), and
a third gear is implemented by engagement of he second shifting element (K12).

3. The transmission according to claim 1, wherein the first, the second and the third shifting elements are each frictional shifting elements.

4. The transmission according to claim 1, wherein the second shifting element (K12) and the third shifting element (K23) are each interlocking shifting elements and the first shifting element (B03) is a frictional shifting element.

5. The transmission according to claim 1, wherein the second shifting element (K12) and the third shifting element (K23) are combined in a shifting packet as a dual shifting element (DS).

6. A transmission comprising:
a drive input shaft (AN),
a drive output shaft (AB),
a housing (G),
at least first and second planetary gearsets (PR1, PR2), and each of the first and the second planetary gearsets comprising a ring gear, a sun gear and a carrier,
at least first, second and third shifting elements (B03, K12, K23), and selective engagement of the first, the second and the third shifting elements producing various transmission ratios between the drive input shaft (AN) and the drive output shaft (AB) such that at least three gears are implementable, the ring gear (H1) of the first planetary gearset (PR1) forming a first shaft (1).

the drive output shaft (AB) and the carrier (ST1) of the first planetary gearset (PR1) being connected to one another in a rotationaHy fixed manner for forming the second shaft (2), the ring gear (H2) of the second planetary gearset (PR2) forming a third shaft (3), the sun gear (S1) of the first planetary gearset (PR1) and the sun gear (S2) of the second planetary gearset (PR2) both being connected to one another in a rotationally fixed manner for forming a fourth shaft (4), p1 the carrier (ST2) of the second planetary gearset (PR2) being coupled to the housing (G) of the transmission in a rotationally fixed manner, the first shifting element (B03) being arranged in a force flow between the third shaft (3) and the housing (G) of the transmission, the third shifting element (K23) being arranged in a force flow between the second shaft (2) and the third shaft (3), and the second shifting element (K12) being arranged in a force flow either between the first shaft (1) and the second shaft (2) or between the second shaft (2) and the fourth shaft (4), a third planetary gearset (PR3) being connected upstream of the transmission, a sun gear (S3) of the third planetary gearset (PR3) forming a fifth shaft (5) of the transmission connected with the drive input shaft (AN), a ring gear (H3) of the third planetary gearset (PR3) being a rotationally fixed element, and a carrier (ST3) of the third planetary gearset (PR3) being connected to the first shaft (1) of the transmission in a rotationally fixed manner.

7. The transmission according to claim 1, wherein the transmission is a main transmission of a group transmission, which comprises an upstream group in driving connection upstream of the main transmission.

8. A method of operating a transmission having a drive input shaft (AN), a drive output shaft (AB), and a housing (G), at least first and second planetary gearsets (PR1, PR2), and each of the first and the second planetary gearsets comprises a ring gear, a sun gear and a carrier, at least first, second and third shifting elements (B03, K12, K23), and selective engagement of the first, the second and the third shifting elements produces various transmission ratios between the drive input shaft (AN) and the drive output shaft (AB) such that at least three gears are implementable, the drive input shaft (AN) and the ring gear (H1) of the first planetary gearset (PR1) are connected to one another in a rotationally fixed manner for forming a first shaft (1), the drive output shaft (AB) and the carrier (ST1) of the first planetary gearset (PR1) are connected to one another in a rotationally fixed manner for forming the second shaft (2), the ring gear (H2) of the second planetary gearset (PR2) forms a third shaft (3), the sun gear (S1) of the first planetary gearset (PR1) and the sun gear (S2) of the second planetary gearset (PR2) are both connected to one another in a rotationally fixed manner for forming a fourth shaft (4), the carrier (ST2) of the second planetary gearset (PR2) is coupled to the housing (G) of the transmission in a rotationally fixed manner, the first shifting element (B03) is arranged in a force flow between the third shaft (3) and the housing (G) of the transmission, the third shifting element (K23) is arranged in the force flow between the second shaft (2) and the third shaft (3), and the second shifting element (K12) is arranged in a force flow either between the first shaft (1) and the second shaft (2) or between the second shaft (2) and the fourth shaft (4), the method comprising the steps of:

implementing one of the at least three gears by engaging one of the first, the second and the third shifting elements and disengaging the other two of the first, the second and the third shifting elements, and carrying out a gearshift to an either adjacent higher gear or an adjacent lower gear by engaging one previously disengaged shifting element and disengaging the previously engaged shifting element.

9. The method according to claim 8, further comprising the step of carrying out at least a traction upshift from a first gear to a second gear as a powershift, a traction downshift from the second gear to the first gear as a powershift, an overdrive upshift from the second gear to a third gear as a powershift, and an overdrive downshift from the third gear to the second gear as a powershift.

10. The transmission according to claim 1, the transmission is incorporated in a drive-train for a motor vehicle.

11. The transmission according to claim 10, wherein a drive aggregate is an electric machine and, depending upon a rotational drive direction of the electric machine, the three gears are implemented as either forward gears or reverse gears.

12. The transmission according to claim 11, wherein the drive-train is a hybrid drive-train and comprises an internal combustion engine.

13. A transmission comprising:
a drive input shaft (AN),
a drive output shaft (AB),
a housing (G),
at least first and second planetary gearsets (PR1, PR2), and each of the first and the second planetary gearsets comprising a ring gear, a sun gear and a carrier,
at least first, second and third shifting elements (B03, K12, K23), and selective engagement of the first, the second and the third shifting elements producing various transmission ratios between the drive input shaft (AN) and the drive output shaft (AB) such that at least three gears are implementable,
the drive input shaft (AN) and the ring gear (H1) of the first planetary gearset (PR1) being directly connected to one another in a rotationally fixed manner for forming a first shaft (1),
the drive output shaft (AB) and the carrier (ST1) of the first planetary gearset (PR1) being directly connected to one another in a rotationally fixed manner for forming the second shaft (2),
the ring gear (H2) of the second planetary gearset (PR2) forming a third shaft (3),
the sun gear (S1) of the first planetary gearset (PR1) and the sun gear (S2) of the second planetary gearset (PR2) both being directly connected to one another in a rotationally fixed manner for forming a fourth shaft (4),
the carrier (ST2) of the second planetary gearset (PR2) being directly coupled to the housing (G) of the transmission in a rotationally fixed manner,
the first shifting element (B03) being arranged in a force flow between the third shaft (3) and the housing (G) of the transmission,
the third shifting element (K23) being arranged in a force flow between the second shaft (2) and the third shaft (3), and the second shifting element (K12) being arranged in a force flow either between the first shaft (1) and the second shaft (2) or between the second shaft (2) and the fourth shaft (4).

\* \* \* \* \*